June 5, 1934.  W. J. MORRILL  1,961,776

ADJUSTABLE SPEED MOTOR

Filed Sept. 13, 1932

Inventor:
Wayne J. Morrill,
by Charles E. Mullen
His Attorney.

Patented June 5, 1934

1,961,776

UNITED STATES PATENT OFFICE 1,961,776

ADJUSTABLE SPEED MOTOR

Wayne J. Morrill, Fort Wayne, Ind., assignor to General Electric Company, a corporation of New York Application September 13, 1932, Serial No. 632,926

19 Claims. (Cl. 172—278)

My invention relates to adjustable speed alternating current motors, and is particularly applicable to small and medium sized motors which are generally of the single phase, split phase type. It is the primary object of my invention to arrange such motors for operation at two or more stable operating speeds in a simple manner without employing extra parts or devices except the control switch.

In the single phase, split phase motor the primary is usually provided with two windings displaced to produce fluxes along different axes, usually 90 electrical degrees apart. One of these windings is called the starting winding, and is usually connected with some form of phase modifying device, such as resistance, reactance, or capacity to displace the phase of the current in the starting winding from that in the other or main winding for starting purposes. When the motor has come up to speed, the starting winding may be disconnected or the phase splitting device short-circuited or its influence modified. In accordance with a preferred modification of my invention, I start this type of motor in one of the usual ways, but use one of the primary windings individually for one operating speed and the other primary winding individually for another operating speed. No additional winding tap or voltage control means are necessary.

Figure 1:
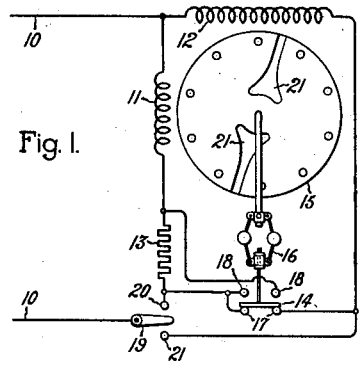
Figure 3:
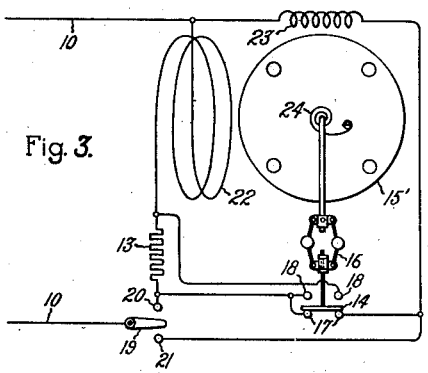
Figure 2:
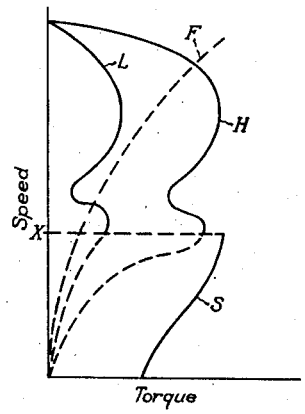
Figure 4:
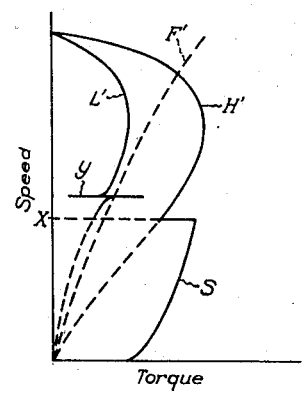
Figure 5:
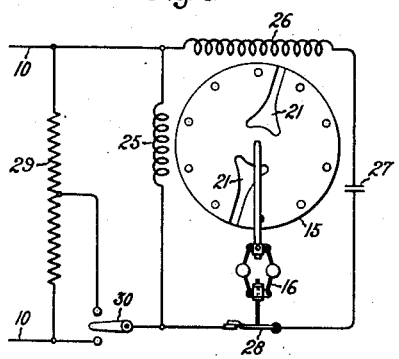
Figure 6:
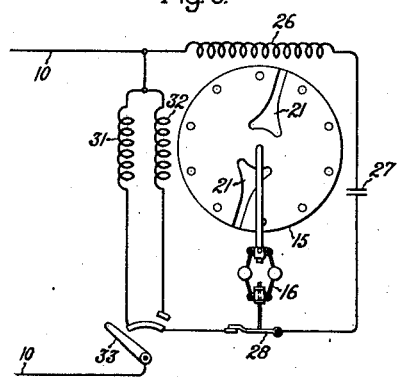

The features of my invention which are believed to be novel and patentable will be pointed out in the claims appended hereto. For a better understanding of my invention, reference is made in the following description to the accompanying drawing, in which Fig. 1 illustrates a preferred embodiment of my invention; Figs. 2 and 4 represent different speed torque curves such as may be obtained by the use of my invention; Fig. 3 is a modified motor that may be used with my invention, and Figs. 5 and 6 represent other schemes for obtaining the different torque fluxes of the motor for the different operating speeds.

In the drawing, Fig. 1, 10 represents the usual single phase source of alternating current supply. The primary of the motor is illustrated as the stationary member, and comprises the two windings 11 and 12 displaced at 90 electrical degrees to each other. The relative number of turns and relative impedances of these windings will vary with the type of phase modifying device used, the operating speeds desired, and the type of load for which the motor is intended, but in any event the two primary windings will be different so as to give different speed torque characteristics when used alone.

The windings are both connected at one end to one side of the line. A phase modifying device, here represented as a resistance 13, is connected in series with winding 11, which resistance is arranged to be cut out of circuit after the starting operation by the switch 14, which is preferably automatic in operation. Winding 11 thus corresponds to the usual starting winding of this type of motor.

The secondary 15 is represented as the motor rotor, and is preferably of the squirrel cage variety. It operates the speed responsive switch 14 through a centrifugal governor 16.

The automatic switch has two sets of contacts 17 and 18. When the motor is at rest and operating over the low speed starting range, contacts 17 are closed and connect winding 12 in parallel with winding 11 and starting resistance 13 across the line. As the motor comes up to speed, but before it reaches the lowest normal operating speed, the speed responsive device 16 opens contacts 17 and closes contacts 18, thereby cutting out starting resistance 13, and opens the circuit through contacts 17.

At 19 is shown a single pole, double throw switch, which is arranged to connect one side of the line to either contact 20 or 21. This switch is the speed control switch for the motor, as well as the line disconnecting switch therefor. Its stationary contact 20 is permanently connected to the line side of resistance 13 and to one of each pair of contacts 17 and 18 of the automatic switch. Stationary contact 21 of the line control switch is permanently connected to winding 12 and the other contact 17 of the speed control switch.

With the connections as described, it will be seen that the starting conditions of the motor will be exactly the same with switch 19 on either contact 20 or 21, i. e., winding 11 with resistance 13 in series will be connected in parallel with winding 12 across the line. However, after the automatic switch operates, winding 11 only will be connected directly across the line when switch 19 is on contact 20, and winding 12 only will be connected directly across the line when switch 19 is on contact 21. Switch 19 thus selects the operating speed desired, and the motor will start equally well for either selection, requiring no further operation of switch 19 after the starting operation. However, this switch may also be used to change the speed while the motor is in normal operation, if that becomes desirable.

Referring now to Fig. 2, where the ordinates of the curves represent speed, and the abscissa torque. Curve S represents the starting speed torque curve of the motor with both windings 11 and 12 connected and the resistance 13 in series with winding 11. At speed X the speed responsive switch operates. Curve L represents the single phase speed torque characteristics obtainable with winding 12 alone, that portion shown in full lines being the only portion of the curve which is ever available, because below speed X this winding is not used individually. Curve H represents the speed torque curve obtainable with winding 11 alone without the resistance 13 in series therewith, and the full line portion of this curve above speed X is that portion of this curve which is available after the starting operation is completed.

Thus, with switch 19 on contact 21 for low speed operation, the motor will start in accordance with curve S and operate in accordance with the full line portion of curve L. With switch 19 on contact 20 for high speed operation, the starting characteristics will be the same as before and the operating characteristics will be represented by the full line portion of curve H. It will be noted that both speed torque curves have low torque points at a fraction of or about half full speed. I purposely designed the motor so that it will have this characteristic. There are many ways of designing an alternating current motor both of the single phase and polyphase type so that it will have one or more low torque points in its speed torque curve. In general, such characteristics have heretofore been considered undesirable and have been avoided so far as possible, but in the present invention I make use of this characteristic to obtain a stable low speed operating range. Such characteristics may be obtained, for example, by a proper selection of the relative number of stator and rotor slots so as to emphasize the effect of certain harmonics upon the torque at various particular speeds. A discussion of this phenomenon, sometimes called the "Gorges effect", is found under the heading "Saddle points" in Hobart's "Electric Motors", Vol. II, third edition, 1923, pp. 175 to 187. The low torque characteristics of the curves may also be produced by partially cutting away the end ring or plate of the squirrel cage rotor at polar points. In a two-pole motor the end plate comprising the end connections for the squirrel cage winding is cut away at diametrically opposite points, as at 21, Fig. 1, so as to nearly divide the squirrel cage winding into two parts. The flux due to the current flowing in the squirrel cage winding will then be primarily along an axis through the rotor at right angles to the slots in the end plates giving the rotor a two phase characteristic. I have found that by thus making the resistance of the end ring or plate high at polar points results in obtaining single phase speed torque characteristics such as represented in Fig. 2. The illustration of Fig. 1 is for a two-pole motor, but the idea is not confined to a two-pole motor.

Curve F, Fig. 2, represents the typical speed torque requirements of a fan load, and if the motor is connected to such a load it will be evident that the fan may be driven at two stable operating speeds corresponding to the points where curve F crosses curves L and H, and when above speed X may be changed from one speed to the other without going through the starting operation. A high torque half speed stable operating range is also available just below the dip in the high torque curve.

Winding 12 has been described as the low speed winding, and the winding 11, used for starting, as the high speed winding. This will be the preferable arrangement where a resistance split is employed, but I do not confine myself to this arrangement, nor to resistance split starting, as it will be obvious to those familiar with this type of motor that the characteristics of the windings and the type of phase splitting device employed may be varied to suit the requirements desired.

In Fig. 3, I have represented a motor employing an arrangement for producing a synchronous torque dip at ½ speed. In this motor one of the stator windings 22 is a concentrated full pitch winding and the other 23 is preferably a usual form of distributed winding. It is known that a winding such as is represented at 22 produces a flux distribution having a prominent forward revolving third harmonic of flux. If now a squirrel cage rotor be provided having two bars per pole it will produce a backward rotating third harmonic of flux. At 15', I have represented a rotor having four squirrel cage bars, and the motor will be considered as a two-pole motor. With such an arrangement, when winding 22 is energized the forward rotating third harmonic of flux of the stator locks with the backward rotating third harmonic of flux of the rotor and produces a synchronous locking torque at exactly ½ full synchronous speed. The rotor is preferably fastened to its shaft by a spring 24 or some other equivalent lost motion connection to assist this locking in action at ½ speed and prevent acceleration through this synchronous torque dip point when it is desired to operate at that speed. The motor connections are the same as represented in Fig. 1 and need not be further explained. The operating characteristics of such a motor may be as represented by the curves of Fig. 4, where S represents the starting torque with both stator windings energized, H' the single phase torque of the distributed winding 23, and L' the single phase torque of the concentrated winding 22. The horizontal portion Y of curve L', which appears to cross the curve L' at ½ synchronous speed, represents the synchronous torque dip obtained as above explained. It is represented in both directions from curve L' because it is a synchronous torque and resists rotation both above and below that speed to the extent indicated. The magnitude of this ½ speed synchronous torque may, of course, be controlled by design. With a load corresponding to that represented by curve F' we may operate at speed Y, using winding 22, and at the speed where F' crosses curve H', using winding 23. Curve S and speed X have the same significance as explained in connection with Fig. 1.

It will be recognized that in Fig. 1 the method of varying the torque to obtain the curves L and H is by varying the effective ampere turns or effective flux produced by the active portion of the stator winding. Any other scheme for varying the torque flux may be utilized. In Fig. 5, I have shown a single phase motor having a main winding 25, a starting winding 26, with a capacitance 27 as the phase splitting device. A centrifugal switch 28 cuts out the condenser and starting winding after the starting operation. I provide means, such as an auto-transformer 29 and tap switch 30 for varying the voltage on the main winding 25 to obtain the desired change in motor torque after the starting operation.

It will be evident that this motor, if arranged to develop a torque difference, as by use of a partially divided squirrel cage rotor, it will have single phase speed torque characteristics analogous to those depicted in Fig. 2 but the different torques being obtained by varying the voltage impressed on winding 25.

The motor of Fig. 5 may be started on either transformer tap, depending upon starting torque and current limit requirements. For effecting low speed running operation, the control switch 30 will be connected to the low voltage tap, and for high speed running to the high voltage tap of transformer 29.

Fig. 6 represents a further modification of the invention, where the torque flux variation is obtained by providing a two-section main winding with provision for connecting one or both sections in circuit to obtain low and high torque operations. In this figure, 31 and 32 represent the two sections of the main winding, and 33 the line and speed control switch. The other parts are as represented in Fig. 5.

Other arrangements for carrying out the principles of the invention herein described will occur to those skilled in the art, and such other arrangements and modifications as fall within the true spirit of the invention are intended to be included within the scope of the appended claims.

What I claim as new and desire to secure by Letters Patent of the United States is:

1. A two-speed alternating current motor having relatively rotatable primary and secondary winding members, said motor being designed to have a pronounced torque dip in its speed torque curve at a speed materially below its free running speed, and means for varying the excitation of the primary member between high and low values to vary the motor torque such that when energized at the low value the motor will have a stable low speed torque range at slightly below the speed where the torque dip occurs, and when energized at the high value its minimum torque at such low torque point will exceed the maximum torque of said low speed torque range and it will have a stable high speed torque operating range slightly below its free running speed.

2. An alternating current motor having relatively rotatable primary and secondary members designed to produce a pronounced torque dip at a fraction of the free running speed of the motor, and means whereby the torque flux of said motor may be varied for the purpose of obtaining stable load operating speeds materially above and just below the speed at which said torque dip is a maximum.

3. A single phase alternating current motor having primary and secondary members, the primary winding having two windings displaced at an angle to each other, phase modifying means associated with one of said windings for obtaining split phase starting, said motor being designed to have a pronounced single phase torque dip at a fraction of its free running speed, and means for varying the torque flux of said primary to obtain a stable single phase motor operating speed just below the speed where the maximum torque dip occurs, and a higher stable single phase motor operating speed below its free running speed.

4. A single phase alternating current motor having a secondary, and two primary windings displaced at an angle to each other, apparatus for connecting said windings in parallel circuits for split phase motor starting purposes and for disconnecting either of said windings for normal operation, said windings being designed to produce different speed torque characteristics in the motor when used individually, and means for causing the motor to develop a prominent dip in the speed torque curve of lower value at a speed materially below full running light speed to establish a stable motor operating speed thereat.

5. An alternating current motor comprising a two-winding primary and an induction motor secondary, said windings being designed to produce different speed torque characteristics with substantially the same running light top speeds when used individually, means for causing the motor to develop a prominent dip in the speed torque curve of lower value materially below the running light top speed to establish a stable motor operating speed thereat, and means for energizing either of said primary windings individually.

6. A single phase alternating current motor having a primary member with two windings displaced at an angle to each other, said windings having different characteristics capable, when used individually, of producing different speed torque characteristics, a phase modifying device, means for connecting said windings in parallel with the phase modifying device in series with one of them for starting purposes, and means for disconnecting either of said windings and short-circuiting the phase modifying device for normal operation.

7. A single phase alternating current motor having a primary member with two windings displaced at an angle to each other, said windings having different characteristics capable when used individually of producing different speed torque characteristics, phase modifying means, means for connecting said windings in parallel with the phase modifying means in series with one of them for motor starting purposes, means for disconnecting one of said windings and short-circuiting the phase modifying means as the motor comes up to operating speed, and means for selecting which one of said windings will be thus disconnected.

8. A single phase alternating current motor having two primary windings displaced at an angle to each other, said windings having characteristics capable of producing different speed torque characteristics when used individually, a phase modifying device, means for connecting said windings in parallel with the phase modifying means operatively associated with one of said windings for motor starting purposes, automatic means responsive to an increasing speed of the motor which is below the lowest normal operating speed thereof for disconnecting one of said windings and the phase modifying means, and an energizing switch for said motor for selecting which of said windings will be thus automatically disconnected.

9. A single phase alternating current motor having two primary windings displaced at an angle to each other, and apparatus for connecting said windings in parallel circuits for split phase motor starting purposes, said windings being designed to produce different single phase speed torque characteristics when used individually, said apparatus including switching means for selectively deenergizing one or the other of said windings after the motor has been started.

10. A single phase motor having two primary windings displaced at an angle to each other, said windings having different characteristics such that, when used individually, they are capable of producing different single phase speed torque characteristics, phase modifying means, switching means for connecting said windings in parallel with the phase modifying means in series with the primary winding capable of producing the higher motor operating speed, said connection being used for starting purposes, motor speed responsive means for altering said switching means so as to disconnect one of said windings and short-circuit the phase modifying means, and a line switch for said motor having different motor energizing positions selective as to which of the motor windings will be disconnected by the speed responsive means.

11. In combination with a source of single phase alternating current, a motor having two primary windings disposed at an angle to each other, said windings having different characteristics such that when energized individually they will produce materially different, stable motor operating speeds, apparatus for connecting said windings in parallel circuits to said source of supply for split phase motor starting, said apparatus including automatic switching means for deenergizing one of said windings as the motor comes up to speed, and manual switching means for energizing and deenergizing said motor and selecting the winding which is energized in normal operation.

12. An alternating current motor having two primary windings and an induction motor secondary, said primary windings being designed to produce materially different torques when used individually over substantially the same speed range, the secondary being designed to produce a prominent dip in the speed torque curve of lower value at a fraction of full running light speed whereby the motor may be operated at such speed with a given load when the low torque winding is energized alone, and means for selectively energizing either of said primary windings individually.

13. A two-speed alternating current motor having a high torque primary winding and a low torque primary winding of the same pole number, an induction motor secondary, means for selectively energizing said windings individually, and means for causing the motor to have a prominent dip in its speed torque curve when the low torque winding is energized alone to establish a stable low torque motor operation range just below the speed at which said torque dip occurs.

14. A single phase alternating current motor comprising a secondary member, a primary member with a high torque winding and a low torque winding displaced at an angle to each other, a phase modifying device, means for connecting said windings in parallel with the phase modifying device in series with one of them for starting purposes, means for disconnecting either of said windings and the phase modifying device for normal operation with the winding not thus disconnected, and means for causing said motor to have a pronounced torque dip in its speed torque curve as produced by either winding used individually at a speed materially below the free running speed thereof to obtain a stable load operating range at approximately such speed.

15. A two-speed single phase alternating current motor having low torque and high torque primary windings displaced at an angle to each other, at least one of said windings being a full pitch concentrated winding, means for connecting said windings in parallel circuits for split phase motor starting purposes, means for disconnecting one of said windings for single phase motor operation with the other winding, and a secondary of the induction type having two secondary bars per pole to give the motor a synchronous torque point in one of its single phase speed torque curves at half full synchronous speed to provide a stable low operating speed for the motor.

16. A two-speed single phase alternating current motor comprising a secondary rotor member, a primary member having low torque and high torque windings of the same pole number displaced at an angle to each other, means for connecting said windings in parallel for split phase motor starting purposes, means for disconnecting either of said windings for single phase motor operation on the other winding, means for causing the motor to have a synchronous torque dip in its single phase speed torque curve when the low torque winding is used at a speed materially below its free running speed, a shaft for the motor, and means permitting limited relative rotational movement between the rotor and the shaft.

17. A single phase motor having windings displaced at an angle to each other, phase modifying means associated with one of said windings for starting purposes, means for disconnecting one of said windings after the motor is started, means for varying the voltage impressed on said motor, said motor having a pronounced torque dip in the single phase torque speed curve thereof at a fraction of full speed whereby by varying the voltage more than one stable load running speed is obtained.

18. A single phase motor having main and starting windings displaced at an angle to each other, phase modifying means associated with the starting winding for starting purposes, means for disconnecting said starting winding after the motor is started, the main winding being divided into sections, means for varying the torque flux of said motor by changing the manner of exciting said main winding, said motor having a pronounced torque dip in its single phase speed torque characteristic whereby by varying the torque flux more than one stable load running speed is obtained.

19. A multi-speed single phase motor having two primary windings displaced at an angle to each other, phase shifting means associated with one of said windings for split phase starting purposes, a squirrel cage secondary for said motor designed to effect and effecting a torque dip in the single phase speed torque curve of said motor at a fraction of its full running speed, and control means for said motor for effecting single phase motor operation above and below said fraction of full running speed.

WAYNE J. MORRILL.